(12) United States Patent
Hashiguchi et al.

(10) Patent No.: US 12,384,915 B2
(45) Date of Patent: Aug. 12, 2025

(54) RESIN TUBE

(71) Applicant: KANEKA CORPORATION, Osaka (JP)

(72) Inventors: Tomoaki Hashiguchi, Settsu (JP); Tetsuo Okura, Settsu (JP)

(73) Assignee: KANEKA CORPORATION, Osaka (JP)

( * ) Notice: Subject to any disclaimer, the term of this patent is extended or adjusted under 35 U.S.C. 154(b) by 431 days.

(21) Appl. No.: 18/004,557

(22) PCT Filed: Jun. 28, 2021

(86) PCT No.: PCT/JP2021/024312
§ 371 (c)(1),
(2) Date: Jan. 6, 2023

(87) PCT Pub. No.: WO2022/009717
PCT Pub. Date: Jan. 13, 2022

(65) Prior Publication Data
US 2023/0235170 A1 Jul. 27, 2023

(30) Foreign Application Priority Data
Jul. 7, 2020 (JP) ................... 2020-116980

(51) Int. Cl.
C08L 67/04 (2006.01)
A47G 21/18 (2006.01)
F16L 11/06 (2006.01)

(52) U.S. Cl.
CPC .............. *C08L 67/04* (2013.01); *A47G 21/18* (2013.01); *C08L 2203/18* (2013.01); *C08L 2205/025* (2013.01); *F16L 11/06* (2013.01)

(58) Field of Classification Search
None
See application file for complete search history.

(56) References Cited

U.S. PATENT DOCUMENTS

| 2011/0171409 A1 | 7/2011 | Yamashita et al. |
| 2020/0340020 A1 | 10/2020 | Arikawa et al. |
| 2021/0301127 A1 | 9/2021 | Okura |

FOREIGN PATENT DOCUMENTS

| JP | 2005-248117 A | 9/2005 |
| JP | 2010-84143 A | 4/2010 |
| WO | WO 2019/142845 A1 | 7/2019 |
| WO | WO 2020/040093 A1 | 2/2020 |

OTHER PUBLICATIONS

International Search Report issued Sep. 7, 2021 in PCT/JP2021/024312, filed on Jun. 28, 2021, 3 pages.

*Primary Examiner* — James C Yager
(74) *Attorney, Agent, or Firm* — Oblon, McClelland, Maier & Neustadt, L.L.P.

(57) ABSTRACT

Provided is a resin tube containing a poly(3-hydroxyalkanoate) resin component. The poly(3-hydroxyalkanoate) resin component includes at least two poly(3-hydroxyalkanoate) resins differing in types and/or contents of constituent monomers. A 50% fracture energy of the resin tube, as measured by an impact resistance test, is 0.2 J or more.

17 Claims, No Drawings

RESIN TUBE

CROSS-REFERENCE TO RELATED APPLICATIONS

The present application is a 35 U.S.C. § 371 national stage patent application of International patent application PCT/JP2021/024312 filed on Jun. 28, 2021, which is based on and claims the benefits of priority to Japanese Application No. 2020-116980 filed on Jul. 7, 2020. The entire contents of these applications are incorporated herein by reference.

TECHNICAL FIELD

The present invention relates to a resin tube containing a poly(3-hydroxyalkanoate) resin component.

BACKGROUND ART

In recent years, separate collection and composting of raw garbage have been promoted especially in Europe, and plastic products that can be composted together with raw garbage have been desired. Additionally, marine pollution caused by microplastics has become an issue of great concern, and there is a demand for development of plastics degradable in seawater.

Poly(3-hydroxyalkanoate) resins are thermoplastic polyesters produced and accumulated as energy storage substances in cells of many kinds of microorganisms. These resins are biodegradable in seawater as well as in soil and thus are attracting attention as materials that can be a solution to the above-mentioned problems.

Patent Literature 1 discloses a resin tube formed from a poly(3-hydroxyalkanoate) resin. This resin tube is pliable, suitable for use as a straw, and has a wall thickness of 0.1 to 0.6 mm.

CITATION LIST

Patent Literature

PTL 1: WO 2020/040093

SUMMARY OF INVENTION

Technical Problem

A conventional resin tube formed from a poly(3-hydroxyalkanoate) resin could be broken when exposed to a strong impact during transportation, when subjected to a secondary process performed at normal temperature (e.g., a corrugating process for making a bendable straw), or when bended repeatedly, and improvement in this regard has been demanded.

In view of the above circumstances, the present invention aims to provide a resin tube containing a poly(3-hydroxyalkanoate) resin component and having high impact resistance.

Solution to Problem

As a result of intensive studies with the goal of solving the above problem, the present inventors have found that a resin tube containing a poly(3-hydroxyalkanoate) resin has high impact resistance when the resin tube is produced using at least two poly(3-hydroxyalkanoate) resins differing in the types and/or contents of constituent monomers and adapted such that a 50% fracture energy as measured by an impact resistance test is equal to or higher than a given value. Based on this finding, the inventors have completed the present invention.

Specifically, the present invention relates to a resin tube containing a poly(3-hydroxyalkanoate) resin component, wherein the poly(3-hydroxyalkanoate) resin component includes at least two poly(3-hydroxyalkanoate) resins differing in types and/or contents of constituent monomers, and a 50% fracture energy of the resin tube, as measured by an impact resistance test, is 0.2 J or more.

Preferably, the poly(3-hydroxyalkanoate) resin component includes a copolymer of 3-hydroxy butyrate units and other hydroxyalkanoate units.

Preferably, the poly(3-hydroxyalkanoate) resin component includes:
  a copolymer (A) which is a copolymer of 3-hydroxy butyrate units and other hydroxyalkanoate units and in which a content of the other hydroxyalkanoate units is from 1 to 6 mol %; and
  a copolymer (B) which is a copolymer of 3-hydroxy butyrate units and other hydroxyalkanoate units and in which a content of the other hydroxyalkanoate units is 24 mol % or more.

Preferably, in the poly(3-hydroxyalkanoate) resin component, a proportion of the copolymer (A) is 40 wt % or more, and a proportion of the copolymer (B) is 60 wt % or less.

Preferably, an average content of the other hydroxyalkanoate units in total monomer units constituting the poly(3-hydroxyalkanoate) resin component is from 5 to 18 mol %.

Preferably, the other hydroxyalkanoate units are 3-hydroxyhexanoate units.

In an embodiment, a wall thickness of the resin tube is from 0.01 to 0.6 mm.

In another embodiment, a wall thickness of the resin tube is from 0.7 to 10 mm.

Advantageous Effects of Invention

The present invention can provide a resin tube containing a poly(3-hydroxyalkanoate) resin component and having high impact resistance.

A preferred aspect of the present invention can provide a resin tube that exhibits good shapeability in a secondary process performed at normal temperature (e.g., a corrugating process for making a bendable straw).

DESCRIPTION OF EMBODIMENTS

Hereinafter, embodiments of the present invention will be described. The present invention is not limited to the embodiments described below.

One embodiment of the present invention relates to a resin tube containing a poly(3-hydroxyalkanoate) resin component.

(Poly(3-hydroxyalkanoate) Resin Component)

The poly(3-hydroxyalkanoate) resin component used is a mixture of at least two poly(3-hydroxyalkanoate) resins differing in the types and/or contents of constituent monomers. The use of the mixture can provide a resin tube having high impact resistance.

Each of the poly(3-hydroxyalkanoate) resins is preferably a polymer containing 3-hydroxyalkanoate units, in particular a polymer containing units represented by the following formula (1).

 (1)

In the formula (1), R is an alkyl group represented by $C_pH_{2p+1}$, and p is an integer from 1 to 15. Examples of R include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

Each of the poly(3-hydroxy alkanoate) resins is particularly preferably a microbially produced poly(3-hydroxyalkanoate) resin. In the microbially produced poly(3-hydroxyalkanoate) resin, all of the 3-hydroxyalkanoate units are contained as (R)-3-hydroxyalkanoate units.

Each of the poly(3-hydroxyalkanoate) resins preferably contains 50 mol % or more of 3-hydroxyalkanoate units (in particular, the units represented by the formula (1)) in the total structural units, and the content of the 3-hydroxyalkanoate units is more preferably 60 mol % or more and even more preferably 70 mol % or more. Each of the poly(3-hydroxy alkanoate) resins may contain only one type or two or more types of 3-hydroxyalkanoate units as polymer structural units or may contain other units (such as 4-hydroxyalkanoate units) in addition to the one type or two or more types of 3-hydroxyalkanoate units.

Each of the poly(3-hydroxyalkanoate) resins is preferably a homopolymer or copolymer containing 3-hydroxy butyrate (hereinafter also referred to as "3HB") units. In particular, all of the 3-hydroxy butyrate units are preferably (R)-3-hydroxy butyrate units. Each of the poly(3-hydroxy alkanoate) resins is preferably a copolymer of 3-hydroxy butyrate units and other hydroxyalkanoate units.

Specific examples of the poly(3-hydroxyalkanoate) resins include poly(3-hydroxy butyrate), poly(3-hydroxy butyrate-co-3-hydroxypropionate), poly(3-hydroxy butyrate-co-3-hydroxyvalerate) (abbreviated as P3HB3HV), poly(3-hydroxybutyrate-co-3-hydroxyvalerate-3-hydroxyhexanoate), poly(3-hydroxy butyrate-co-3-hydroxyhexanoate) (abbreviated as P3HB3HH), poly(3-hydroxy butyrate-co-3-hydroxyheptanoate), poly(3-hydroxy butyrate-co-3-hydroxyoctanoate), poly(3-hydroxy butyrate-co-3-hydroxynonanoate), poly(3-hydroxy butyrate-co-3-hydroxydecanoate), poly(3-hydroxy butyrate-co-3-hydroxyundecanoate), and poly(3-hydroxy butyrate-co-4-hydroxybutyrate) (abbreviated as P3HB4HB). In particular, poly(3-hydroxy butyrate-co-3-hydroxyhexanoate) and poly(3-hydroxy butyrate-co-4-hydroxy butyrate) are preferred in terms of factors such as the resin tube productivity and the mechanical properties of the resin tube, and poly(3-hydroxy butyrate-co-3-hydroxyhexanoate) is more preferred.

In the case where the poly(3-hydroxyalkanoate) resin component includes a copolymer of 3-hydroxy butyrate units and other hydroxyalkanoate units, an average content ratio between the 3-hydroxy butyrate units and the other hydroxyalkanoate units in total monomer units constituting the poly(3-hydroxyalkanoate) resin component (3-hydroxy butyrate units/other hydroxyalkanoate units) is preferably from 95/5 to 82/18 (mol %/mol %), more preferably from 94/6 to 83/17 (mol %/mol %), and even more preferably from 93/7 to 84/16 (mol %/mol %) in order to ensure both the impact resistance of the resin tube and the resin tube productivity.

The average content ratio between different monomer units in total monomer units constituting the poly(3-hydroxyalkanoate) resin component can be determined by a method known to those skilled in the art, such as by a method described in paragraph of WO 2013/147139. The "average content ratio" refers to a molar ratio between different monomer units in total monomer units of the poly(3-hydroxyalkanoate) resin component and particularly refers to a molar ratio between different monomer units contained in the total mixture of the two or more poly(3-hydroxyalkanoate) resins constituting the poly(3-hydroxyalkanoate) resin component.

The weight-average molecular weight of the poly(3-hydroxyalkanoate) resin component is not limited to a particular range, but is preferably from $20 \times 10^4$ to $200 \times 10^4$, more preferably from $25 \times 10^4$ to $150 \times 10^4$, and even more preferably from $30 \times 10^4$ to $100 \times 10^4$ in order to ensure both the impact resistance of the resin tube and the resin tube productivity.

The weight-average molecular weight of each of the poly(3-hydroxyalkanoate) resins constituting the poly(3-hydroxyalkanoate) resin component is not limited to a particular range. For example, in the case of blending a high-crystallinity poly(3-hydroxyalkanoate) resin and a low-crystallinity poly(3-hydroxyalkanoate) resin which are described later, the weight-average molecular weight of the high-crystallinity poly(3-hydroxyalkanoate) resin is preferably from $20 \times 10^4$ to $100 \times 10^4$, more preferably from $22 \times 10^4$ to $80 \times 10^4$, and even more preferably from $25 \times 10^4$ to $60 \times 10^4$ in order to ensure both the impact resistance of the resin tube and the resin tube productivity. The weight-average molecular weight of the low-crystallinity poly(3-hydroxyalkanoate) resin is preferably from $20 \times 10^4$ to $250 \times 10^4$, more preferably from $25 \times 10^4$ to $230 \times 10^4$, and even more preferably from $30 \times 10^4$ to $200 \times 10^4$ in order to ensure both the impact resistance of the resin tube and the resin tube productivity.

The weight-average molecular weight of each poly(3-hydroxyalkanoate) resin or the poly(3-hydroxyalkanoate) resin component can be measured as a polystyrene-equivalent molecular weight by gel permeation chromatography (HPLC GPC system manufactured by Shimadzu Corporation) using a chloroform solution of the resin or resin component. The column used in the gel permeation chromatography may be any column suitable for weight-average molecular weight measurement.

The method for producing each of the poly(3-hydroxyalkanoate) resins is not limited to a particular technique, and may be a chemical synthesis production method or a microbial production method. A microbial production method is more preferred. The microbial production method used can be any known method. Known examples of bacteria that produce copolymers of 3-hydroxy butyrate with other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038; see T. Fukui, Y. Doi, *J. Bacteriol.*, 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable poly(3-hydroxyalkanoate) resin synthesis-related gene introduced may be used depending on the poly(3-hydroxyalkanoate) resin to be produced. The culture conditions including the type of the substrate may be optimized depending on the poly(3-hydroxyalkanoate) resin to be produced.

(Additional Resin)

The resin tube according to one embodiment of the present invention may contain an additional resin in addition to the poly(3-hydroxyalkanoate) resins so long as the additional resin does not impair the effect of the present invention. Examples of the additional resin include: aliphatic polyester resins such as polybutylene succinate adipate, poly butylene succinate, polycaprolactone, and polylactic acid; and aliphatic-aromatic polyester resins such as poly butylene adipate terephthalate, polybutylene sebacate terephthalate, and poly butylene azelate terephthalate. The resin tube may contain one additional resin or two or more additional resins.

The amount of the additional resin is not limited to a particular range, but is preferably 30 parts by weight or less, more preferably 20 parts by weight or less, and even more preferably 10 parts by weight or less per 100 parts by weight of the total amount of the poly(3-hydroxyalkanoate) resin component. The lower limit of the amount of the additional resin is not limited to a particular value and may be (part by weight.

(Additive)

The resin tube according to one embodiment of the present invention may contain an additive so long as the additive does not impair the effect of the present invention. Examples of the additive include a nucleating agent, a lubricant, a plasticizer, an antistatic, a flame retardant, a conductive additive, a heat insulator, a crosslinking agent, an antioxidant, an ultraviolet absorber, a colorant, an inorganic filler, an organic filler, and a hydrolysis inhibitor, and these additives can be used depending on the intended purpose. Biodegradable additives are particularly preferred.

Examples of the nucleating agent include pentaerythritol, orotic acid, aspartame, cyanuric acid, glycine, zinc phenylphosphonate, and boron nitride. Among these, pentaerythritol is preferred because it is particularly superior in the accelerating effect on crystallization of the poly(3-hydroxyalkanoate) resin component.

The amount of the nucleating agent used is not limited to a particular range, but is preferably from 0.1 to 5 parts by weight, more preferably from 0.5 to 3 parts by weight, and even more preferably from 0.7 to 1.5 parts by weight per 100 parts by weight of the total amount of the poly(3-hydroxyalkanoate) resin component. One nucleating agent may be used alone, or two or more nucleating agents may be used. The proportions of the nucleating agents used may be adjusted as appropriate depending on the intended purpose.

Examples of the lubricant include behenamide, oleamide, erucamide, stearamide, palmitamide, N-stearyl erucamide, N-stearyl erucamide, ethylenebisstearamide, ethylenebisoleamide, ethylenebiserucamide, ethylenebislaurylamide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the poly(3-hydroxyalkanoate) resin component.

The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the total amount of the poly(3-hydroxyalkanoate) resin component. One lubricant may be used alone, or two or more lubricants may be used. The proportions of the lubricants used can be adjusted as appropriate depending on the intended purpose.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred because they are particularly superior in the plasticizing effect on the poly(3-hydroxyalkanoate) resin component. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate.

The amount of the plasticizer used is not limited to a particular range, but is preferably from 1 to 20 parts by weight, more preferably from 2 to 15 parts by weight, and even more preferably from 3 to 10 parts by weight per 100 parts by weight of the total amount of the poly(3-hydroxyalkanoate) resin component. One plasticizer may be used alone, or two or more plasticizers may be used. The proportions of the plasticizers used can be adjusted as appropriate depending on the intended purpose.

The resin tube according to one embodiment has high impact resistance. In this regard, a 50% fracture energy as measured by an impact resistance test for the resin tube is 0.2 J or more. The 50% fracture energy is preferably 0.3 J or more and more preferably 0.5 J or more. The resin tube that meets the requirement concerning the 50% fracture energy can be obtained by a method as described below in which at least two poly(3-hydroxyalkanoate) resins differing in the types and/or contents of constituent monomers are mixed. The upper limit of the 50% fracture energy of the resin tube is not limited to a particular value and may be any value so long as the effect of the present invention is achieved. In terms of productivity, the 50% fracture energy is, for example, 100 J or less. The details of the method for measuring the 50% fracture energy will be described in Examples.

The term "tube" as used herein refers to a hollow, slender cylindrical molded article having a wall that has a generally constant thickness and that is generally circular in cross-section. The tube can be used as, but is not limited to, a straw or pipe.

In the case where the resin tube according to one embodiment is used as a straw, the wall thickness of the resin tube is preferably from 0.01 to 0.6 mm, more preferably from 0.05 to 0.5 mm, and even more preferably from 0.1 to 0.4 mm so that the straw may avoid collapsing when a beverage is sucked through the straw; that the straw may be flexible enough to resist being fractured, that the straw may cause little injury when its end contacts a fingertip, and that the straw may be quickly biodegraded in seawater.

In the case where the resin tube according to one embodiment is used as a straw, the outer diameter of the resin tube is not limited to a particular range. In terms of the usability of the straw in drinking a beverage, the outer diameter is preferably from 2 to 10 mm, more preferably from 4 to 8 mm, and even more preferably from 5 to 7 mm.

In the case where the resin tube according to one embodiment is used as a pipe, the wall thickness of the resin tube can be set as appropriate by those skilled in the art. The wall thickness is preferably from 0.7 to 10 mm and more preferably from 1 to 8 mm. The pipe is suitable for use in cultivation or catching of seafood products.

The resin tube according to one embodiment is generally circular in cross-section, and the cross-sectional shape is preferably close to a true circle in terms of the usability of the resin tube as a straw or pipe. Thus, the degree of flattening of the cross-sectional shape of the tube, [100× (maximum outer diameter−minimum outer diameter)/maximum outer diameter], is preferably 10% or less, more preferably 8% or less, even more preferably 5% or less, and still even more preferably 3% or less. When the degree of flattening is 0%, this means that the cross-sectional shape is a true circle.

The length of the resin tube according to one embodiment is not limited to a particular range. In the case where the resin tube is used as a straw; the length of the resin tube is preferably from 50 to 350 mm, more preferably from 70 to 300 mm, and even more preferably from 90 to 270 mm in terms of the usability of the straw in drinking a beverage.

The resin tube used as a straw may be a tube that has not been subjected to any secondary process or a tube that has been subjected to a secondary process such as formation of a stopper portion or corrugated portion. The secondary process may be performed under heating of the resin tube, but is preferably performed at normal temperature.

The resin tube according to one embodiment preferably has an elongation at yield. The resin tube that has an elongation at yield is highly resistant to repeated bending and exhibits good shapeability in a secondary process performed at normal temperature. The term "elongation at yield" as used herein means the ability to be elongated beyond the yield point in a tensile test. The elongation at yield of the resin tube is evaluated by a tensile test as described in Examples.

The tensile elongation of the resin tube according to one embodiment is preferably 10% or more, more preferably 30% or more, and even more preferably 50% or more. When the tensile elongation of the resin tube is 10% or more, the resin tube exhibits high workability in the secondary process performed at normal temperature. The upper limit of the tensile elongation of the resin tube is not limited to a particular value and may be any value so long as the effect of the invention is achieved. For example, the upper limit of the tensile elongation is 500%. The tensile elongation of the resin tube is measured by a tensile test as described in Examples.

(Tensile Modulus of Resin Tube)

The resin tube according to one embodiment preferably meets the requirement that the tensile modulus be from 500 to 2000 MPa. When the tensile modulus is 2000 MPa or less, the resin tube has especially high impact resistance. If the tensile modulus is below 500 MPa, the resin tube tends to be excessively flexible and have reduced usability.

The tensile modulus is more preferably 1900 MPa or less, even more preferably 1800 MPa or less, and still even more preferably 1600 MPa or less. The tensile modulus is more preferably 600 MPa or more, even more preferably 700 MPa or more, and particularly preferably 800 MPa or more.

To determine the tensile modulus, a film obtained by cutting the resin tube is subjected to a tensile test at a tensile speed of 100 mm/min using a tensile tester (EZ-LX 1 kN, manufactured by Shimadzu Corporation) according to JIS K 7127. The tensile modulus is calculated based on an S—S curve obtained by the tensile test.

The value of the tensile modulus can be controlled, for example, by adjusting the average content of the other hydroxyalkanoate units in total monomer units constituting the poly(3-hydroxyalkanoate) resin component.

(Method for Producing Resin Tube)

To produce the resin tube according to one embodiment, at least two poly(3-hydroxyalkanoate) resins differing in the types and/or contents of constituent monomers are mixed and used.

In mixing the at least two poly(3-hydroxyalkanoate) resins, it is preferable to combine and mix at least one high-crystallinity poly(3-hydroxyalkanoate) resin and at least one low-crystallinity poly(3-hydroxyalkanoate) resin. In general, high-crystallinity poly(3-hydroxyalkanoate) resins are superior in terms of productivity but have low mechanical strength, while low-crystallinity poly(3-hydroxyalkanoate) resins have good mechanical properties although being inferior in terms of productivity. Mixing of a high-crystallinity poly(3-hydroxyalkanoate) resin and a low-crystallinity poly(3-hydroxyalkanoate) resin is expected to lead to the result that the high-crystallinity poly(3-hydroxyalkanoate) resin forms fine resin crystal grains and the low-crystallinity poly(3-hydroxyalkanoate) resin forms tie molecules that cross-link the resin crystal grains to one another. The combined use of these resins can provide a marked increase in the impact resistance of the resin tube.

In the case where the high-crystallinity poly(3-hydroxyalkanoate) resin contains 3-hydroxy butyrate units, the content of the 3-hydroxy butyrate units in the high-crystallinity poly(3-hydroxyalkanoate) resin is preferably higher than the average content of 3-hydroxy butyrate units in total monomer units constituting the poly(3-hydroxyalkanoate) resin component.

In the case where the high-crystallinity poly(3-hydroxyalkanoate) resin contains 3-hydroxy butyrate units and other hydroxyalkanoate units, the content of the other hydroxyalkanoate units in the high-crystallinity resin is preferably from 1 to 10 mol %, more preferably from 1 to 8 mol %, and even more preferably from 1 to 6 mol %.

The high-crystallinity poly(3-hydroxyalkanoate) resin component is preferably poly(3-hydroxy butyrate-co-3-hydroxyhexanoate) or poly(3-hydroxy butyrate-co-4-hydroxy butyrate) and more preferably poly(3-hydroxy butyrate-co-3-hydroxyhexanoate).

In the case where the low-crystallinity poly(3-hydroxyalkanoate) resin contains 3-hydroxy butyrate units, the content of the 3-hydroxy butyrate units in the low-crystallinity poly(3-hydroxyalkanoate) resin is preferably lower than the average content of 3-hydroxy butyrate units in total monomer units constituting the poly(3-hydroxyalkanoate) resin component.

In the case where the low-crystallinity poly(3-hydroxyalkanoate) resin contains 3-hydroxy butyrate units and other hydroxyalkanoate units, the content of the other hydroxyalkanoate units in the low-crystallinity resin is preferably from 24 to 99 mol %, more preferably from 24 to 50 mol %, even more preferably from 24 to 35 mol %, and particularly preferably from 24 to 30 mol %.

The low-crystallinity poly(3-hydroxyalkanoate) resin is preferably poly(3-hydroxy butyrate-co-3-hydroxyhexanoate) or poly(3-hydroxy butyrate-co-4-hydroxy butyrate) and more preferably poly(3-hydroxy butyrate-co-3-hydroxyhexanoate).

In the case where the high-crystallinity poly(3-hydroxyalkanoate) resin and the low-crystallinity poly(3-hydroxyalkanoate) resin are used in combination, the proportion of each resin to the total amount of the two resins is not limited to a particular range. Preferably, the proportion of the high-crystallinity poly(3-hydroxyalkanoate) resin is from 40 to 95 wt %, and the proportion of the low-crystallinity poly(3-hydroxy alkanoate) resin is from 5 to 60 wt %. More preferably, the proportion of the high-crystallinity poly(3-hydroxyalkanoate) resin is from 40 to 90 wt %, and the proportion of the low-crystallinity poly(3-hydroxyalkanoate) resin is from 10 to 60 wt %. Even more preferably, the proportion of the high-crystallinity poly(3-hydroxyalkanoate) resin is from 45 to 80 wt %, and the proportion of the low-crystallinity poly(3-hydroxyalkanoate) resin is from 20 to 55 wt %.

The method for obtaining a blend of two or more poly(3-hydroxyalkanoate) resins is not limited to a particular technique. The blend may be obtained by microbial production or chemical synthesis. Alternatively, the blend may be obtained by melting and kneading the two or more resins using an extruder, a kneader, a Banbury mixer, or a roll-mill or by dissolving and mixing the two or more resins in a solvent and drying the resulting mixture.

The resin tube according to one embodiment can be produced by a known method. For example, the resin tube can be produced by melting a blend of poly(3-hydroxyalkanoate) resins in an extruder, then extruding the molten blend from an annular die connected to the outlet of the extruder, and placing the extruded blend into water to solidify the blend into the shape of a tube.

EXAMPLES

Hereinafter, the present invention will be specifically described using examples. The technical scope of the present invention is not limited by the examples given below.

The following describes the materials used in Examples and Comparative Examples.

[Poly(3-hydroxyalkanoate) Resins]

P3HB3HH-1: P3HB3HH (average content ratio 3HB/3HH=95.4/4.6 (mol %/mol %), weight–average molecular weight=66×10$^4$ g/mol)

This resin was produced according to a method as described in Example 2 of WO 2019/142845.

P3HB3HH-2: P3HB3HH (average content ratio 3HB/3HH=71.8/28.2 (mol %/mol %), weight-average molecular weight=66×10$^4$ g/mol)

This resin was produced according to a method as described in Example 9 of WO 2019/142845.

P3HB3HH-3: X131A (Kaneka Biodegradable Polymer PHBH™, average content ratio 3HB/3HH=94/6 (mol %/mol %), weight-average molecular weight=60×10$^4$ g/mol)

P3HB3HH-4: X151A (Kaneka Biodegradable Polymer PHBH™, average content ratio 3HB/3HH=89/11 (mol %/mol %), weight-average molecular weight=60×10$^4$ g/mol)

For the case where a mixture of two or more poly(3-hydroxyalkanoate) resins was used as the poly(3-hydroxyalkanoate) resin component, the value of average HH content shown in Table 1 is an average value calculated from the HH content in each of the poly(3-hydroxyalkanoate) resins and the proportions by weight of the poly(3-hydroxyalkanoate) resins.

[Additives]

Additive-1: Pentaerythritol (Neulizer P, manufactured by Mitsubishi Chemical Corporation)

Additive-2: Behenamide (BNT-22H, manufactured by Nippon Fine Chemical Co., Ltd.)

Additive-3: Erucamide (NEUTRON-S, manufactured by Nippon Fine Chemical Co., Ltd.)

The following describes methods used for evaluation in Examples and Comparative Examples.

[Evaluation of 50% Fracture Energy]

The resin tube produced was cut into a 40-mm-long piece, which was used as a test specimen. The test specimen was placed on a plate made up of a 3-mm-thick SUS plate and a 2-mm-thick rubber sheet laid on the SUS plate. A given weight was dropped freely from a given height onto the test specimen. The resulting fracture was used as a basis to estimate the drop height at which the probability of fracture would be 50%, and the 50% fracture energy was calculated based on the estimated drop height. The weight was in the shape of a rectangular parallelepiped, and dropped in such a manner that the weight came into parallel contact with the straw:

[Tensile Test: Elongation at Yield and Tensile Elongation]

The resin tube produced was cut to give a film, which was cut into a No. 8 dumbbell shape as specified in JIS K 6251. The cut film was subjected to a tensile test at a tensile speed of 100 mm/min using a tensile tester (EZ-LX 1 kN, manufactured by Shimadzu Corporation) according to JIS K 7127. The S—S curve obtained by the tensile test was used as a basis to evaluate the elongation at yield and calculate the tensile elongation. The elongation at yield was considered "Observed" when the film was elongated beyond the yield point.

[Tensile Test: Evaluation of Tensile Modulus]

The resin tube produced was cut to give a film, which was cut into a No. 8 dumbbell shape as specified in JIS K 6251. The cut film was subjected to a tensile test at a tensile speed of 100 mm/min using a tensile tester (EZ-LX 1 kN, manufactured by Shimadzu Corporation) according to JIS K 7127. The S—S curve obtained by the tensile test was used as a basis to calculate the tensile modulus.

[Tube Moldability]

The cylinder temperature and die temperature of a single-screw extruder having a screw diameter of 50 mm and fitted with an annular die (outer diameter=15 mm, inner diameter=13.5 mm) were set to 165° C. Resin composition pellets were introduced into the extruder and extruded into the shape of a tube at a screw rotational speed of 7.3 rpm. The extruded tube was passed through a 40° C. water bath located 100 mm away from the annular die to fix the shape of the tube. The tube was drawn at a speed of 10 m/min by a haul-off machine equipped with an endless belt. The tube moldability was rated as "Good" when the molded tube had an outer diameter of 6 mm and a wall thickness of 0.2 mm.

Example 1

An amount of 2.25 kg of P3HB3HH-1 and 2.75 kg of P3HB3HH-2 were blended to give a resin formulation shown in Table 1. To the blend were added 50 g of Additive-1, 25 g of Additive-2, and 25 g of Additive-3, and the blend and additives were dry-blended. The resin material thus obtained (resin mixture) was introduced into and extruded by a co-rotating twin-screw extruder having a screw diameter of 26 mm, with the cylinder temperature set to 150° C. and the die temperature set to 150° C. The extruded resin material in the shape of a strand was passed through a water bath filled with 40° C. water to solidify the strand, which was then cut by a pelletizer to obtain resin composition pellets.

The cylinder temperature and die temperature of a single-screw extruder having a screw diameter of 50 mm and fitted with an annular die (outer diameter=15 mm, inner diameter=13.5 mm) were set to 165° C. The resin composition pellets were introduced into the extruder and extruded into the shape of a tube at a screw rotational speed of 7.3 rpm. The extruded tube was passed through a 40° C. water bath located 100 mm away from the annular die, and was drawn at a speed of 10 m/min. As a result, a resin tube with an outer diameter of 6 mm and a wall thickness of 0.2 mm was obtained, and the tube moldability was rated as "Good".

The obtained tube was aged for 1 week, after which the tensile modulus was measured by the tensile test and the 50% fracture energy was measured by the drop weight test. The tensile modulus was measured to be 661 MPa, and the 50% fracture energy was measured to be 20 J or more. The results are summarized in Table 1.

Examples 2 to 9 and Comparative Examples 1 to 3

Resin composition pellets were produced in the same manner as in Example 1, except that the resin formulation was changed as shown in Table 1, and evaluation procedures identical to those in Example 1 were conducted. The results are summarized in Table 2.

TABLE 1

| | Resin formulation | | | | Average | | | | | |
| | First component | | Second component | | HH | 50% fracture | Tensile | | Tensile | |
| | Resin | Amount (wt %) | Resin | Amount (wt %) | content (mol %) | energy (J) | elongation (%) | Elongation at yield | modulus (MPa) | Tube moldability |
|---|---|---|---|---|---|---|---|---|---|---|
| Example 1 | P3HB3HH-1 | 45 | P3HB3HH-2 | 55 | 17.6 | >20 | 333 | Observed | 661 | Good |
| Example 2 | P3HB3HH-1 | 50 | P3HB3HH-2 | 50 | 16.4 | >20 | 310 | Observed | 700 | Good |
| Example 3 | P3HB3HH-1 | 60 | P3HB3HH-2 | 40 | 14.0 | >20 | 327 | Observed | 856 | Good |
| Example 4 | P3HB3HH-1 | 65 | P3HB3HH-2 | 35 | 12.9 | >20 | 287 | Observed | 971 | Good |
| Example 5 | P3HB3HH-1 | 70 | P3HB3HH-2 | 30 | 11.7 | >20 | 269 | Observed | 1087 | Good |
| Example 6 | P3HB3HH-1 | 75 | P3HB3HH-2 | 25 | 10.5 | 15.53 | 273 | Observed | 1267 | Good |
| Example 7 | P3HB3HH-1 | 80 | P3HB3HH-2 | 20 | 9.3 | 7.95 | 286 | Observed | 1442 | Good |
| Example 8 | P3HB3HH-1 | 85 | P3HB3HH-2 | 15 | 8.1 | 4.99 | 149 | Observed | 1505 | Good |
| Example 9 | P3HB3HH-1 | 90 | P3HB3HH-2 | 10 | 7.0 | 0.59 | 110 | Observed | 1803 | Good |
| Example 10 | P3HB3HH-1 | 95 | P3HB3HH-2 | 5 | 5.8 | 0.44 | 10 | Observed | 1845 | Good |
| Comp. Example 1 | P3HB3HH-3 | 100 | — | — | 6 | 0.12 | 3 | Not observed | 2212 | Good |
| Comp. Example 2 | P3HB3HH-4 | 100 | — | — | 11 | — | — | — | — | Poor |
| Comp. Example 3 | P3HB3HH-5 | 50 | P3HB3HH-4 | 50 | 8.5 | 0.15 | 46 | Observed | 1732 | Good |

Table 1 reveals the following findings. For the resin tubes obtained in Examples 1 to 10, the 50% fracture energy was 0.2 J or more, and this demonstrates high impact resistance of the resin tubes. All of the resin tubes of Examples exhibited an elongation at yield and showed a high tensile elongation, and this demonstrates high workability of the resin tubes in a secondary process performed at normal temperature.

For the resin tubes obtained in Comparative Examples 1 and 3, the 50% fracture energy was less than 0.2 J, and this demonstrates insufficient impact resistance of the resin tubes. The resin tube obtained in Comparative Example 1 failed to exhibit an elongation at yield and showed a low tensile elongation, and this demonstrates low workability of the resin tube in a secondary process performed at normal temperature. For Comparative Example 2, the tube moldability was so poor that a molded tube was not obtained.

The invention claimed is:

1. A resin tube comprising a poly(3-hydroxyalkanoate) resin component, wherein
the poly(3-hydroxy alkanoate) resin component comprises at least two poly(3-hydroxyalkanoate) resins differing in types and/or contents of constituent monomers, and
a 50% fracture energy of the resin tube, as measured by an impact resistance test, is at least 0.2 J.

2. The resin tube according to claim 1, wherein the poly(3-hydroxyalkanoate) resin component comprises a copolymer of 3-hydroxy butyrate units and other hydroxyalkanoate units.

3. The resin tube according to claim 2, wherein the poly(3-hydroxyalkanoate) resin component comprises:
a copolymer (A) comprising 3-hydroxybutyrate units and other hydroxyalkanoate units, wherein a content of the other hydroxyalkanoate units in the copolymer (A) is from 1 mol % to 6 mol %; and
a copolymer (B) comprising 3-hydroxybutyrate units and other hydroxyalkanoate units, wherein a content of the other hydroxyalkanoate units in the copolymer (B) is at least 24 mol %.

4. The resin tube according to claim 3, wherein in the poly(3-hydroxyalkanoate) resin component, a proportion of the copolymer (A) is at least 40 wt %, and a proportion of the copolymer (B) is 60 wt % or less.

5. The resin tube according to claim 2, wherein an average content of the other hydroxyalkanoate units in total monomer units constituting the poly(3-hydroxyalkanoate) resin component is from 5 mol % to 18 mol %.

6. The resin tube according to claim 2, wherein the other hydroxyalkanoate units are 3-hydroxyhexanoate units.

7. The resin tube according to claim 1, wherein a wall thickness of the resin tube is from 0.01 mm to 0.6 mm.

8. The resin tube according to claim 1, wherein a wall thickness of the resin tube is from 0.7 mm to 10 mm.

9. The resin tube according to claim 5, wherein the average content of the other hydroxyalkanoate units in total monomer units constituting the poly(3-hydroxyalkanoate) resin component is from 6 mol % to 17 mol %.

10. The resin tube according to claim 5, wherein the average content of the other hydroxyalkanoate units in total monomer units constituting the poly(3-hydroxyalkanoate) resin component is from 7 mol % to 16 mol %.

11. The resin tube according to claim 4, wherein, in the poly(3-hydroxyalkanoate) resin component, the proportion of the copolymer (A) is from 40 to 95 wt %, and the proportion of the copolymer (B) is from 5 wt % to 60 wt %.

12. The resin tube according to claim 4, wherein, in the poly(3-hydroxyalkanoate) resin component, the proportion of the copolymer (A) is from 45 to 80 wt %, and the proportion of the copolymer (B) is from 20 wt % to 55 wt %.

13. The resin tube according to claim 1, wherein a weight-average molecular weight of the poly(3-hydroxyalkanoate) resin component is from $20 \times 10^4$ to $200 \times 10^4$.

14. The resin tube according to claim 1, wherein the resin tube comprises at least one additional resin in addition to the at least two poly(3-hydroxyalkanoate) resins.

15. The resin tube according to claim 14, wherein the additional resin is at least one selected from the group consisting of an aliphatic polyester resin and aliphatic-aromatic polyester resin.

16. The resin tube according to claim 14, wherein a content of the at least one additional resin is 30 parts by weight or less per 100 parts by weight of the total amount of the poly(3-hydroxyalkanoate) resin component.

17. The resin tube according to claim 3, wherein the content of the other hydroxyalkanoate units in the copolymer (B) is from 24 mol % to 99 mol %.

* * * * *